W. L. STRAHLEM.
TURNING DEVICE FOR STEAM SHOVELS.
APPLICATION FILED MAR. 20, 1913.
1,077,174.
Patented Oct. 28, 1913.
3 SHEETS—SHEET 3.
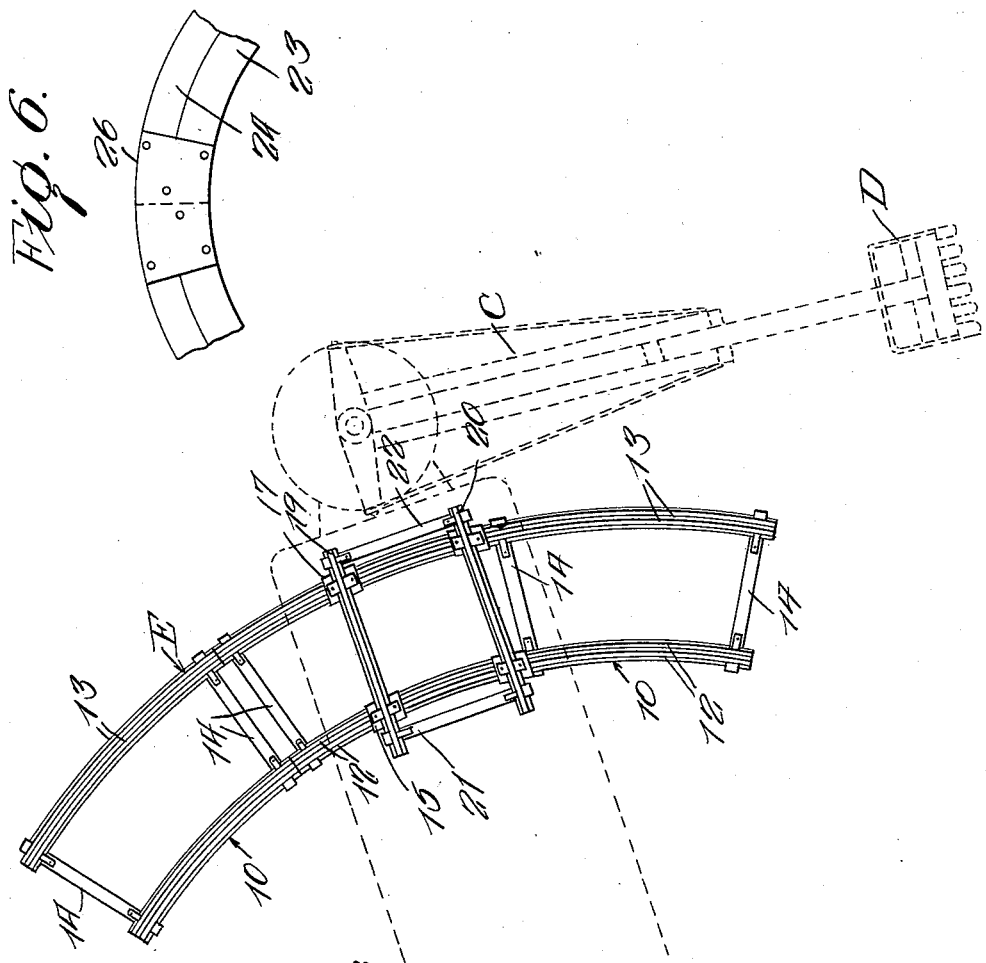
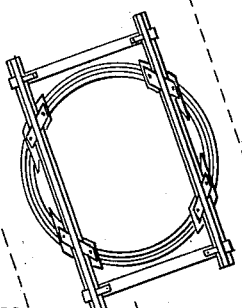

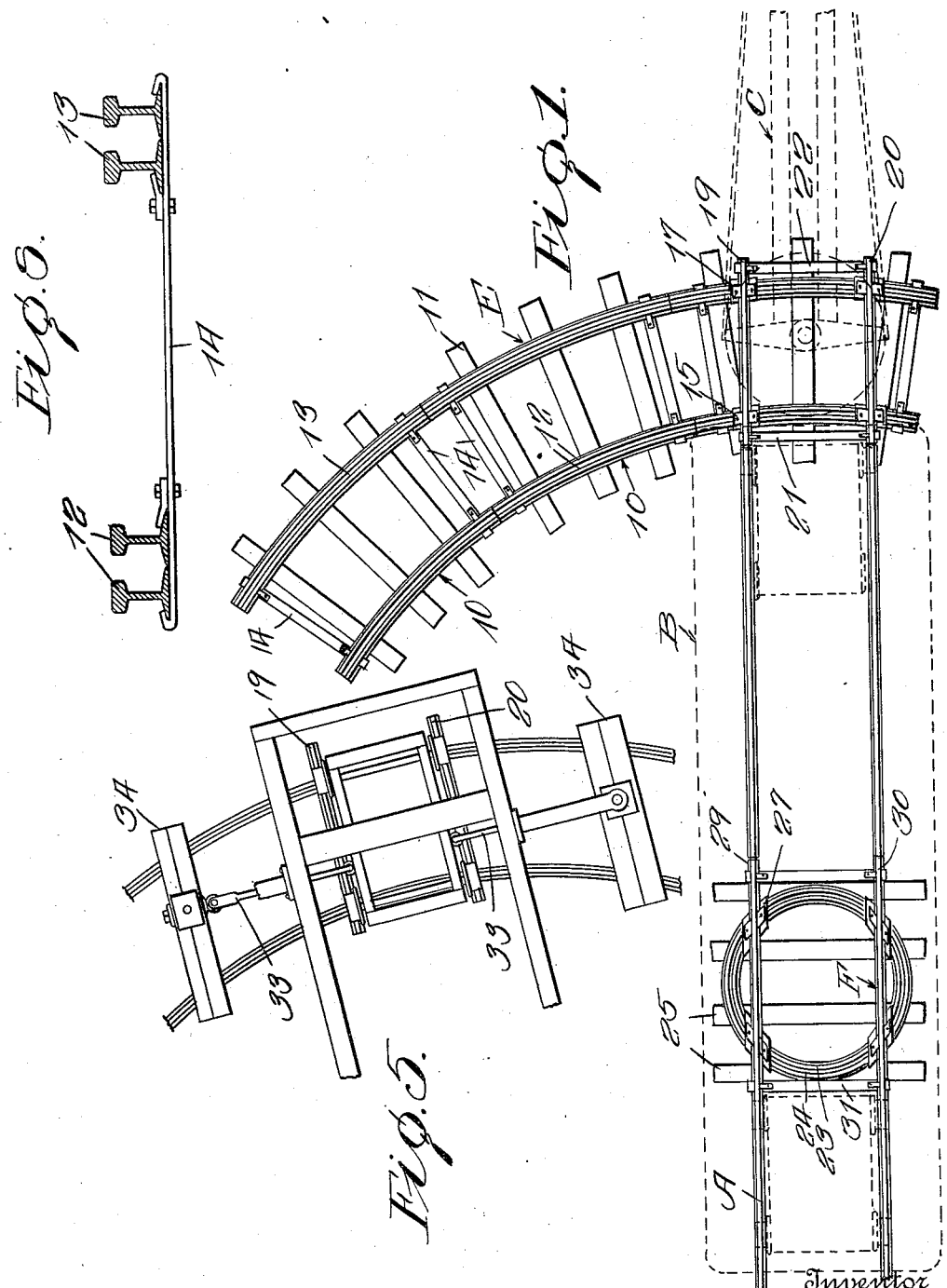

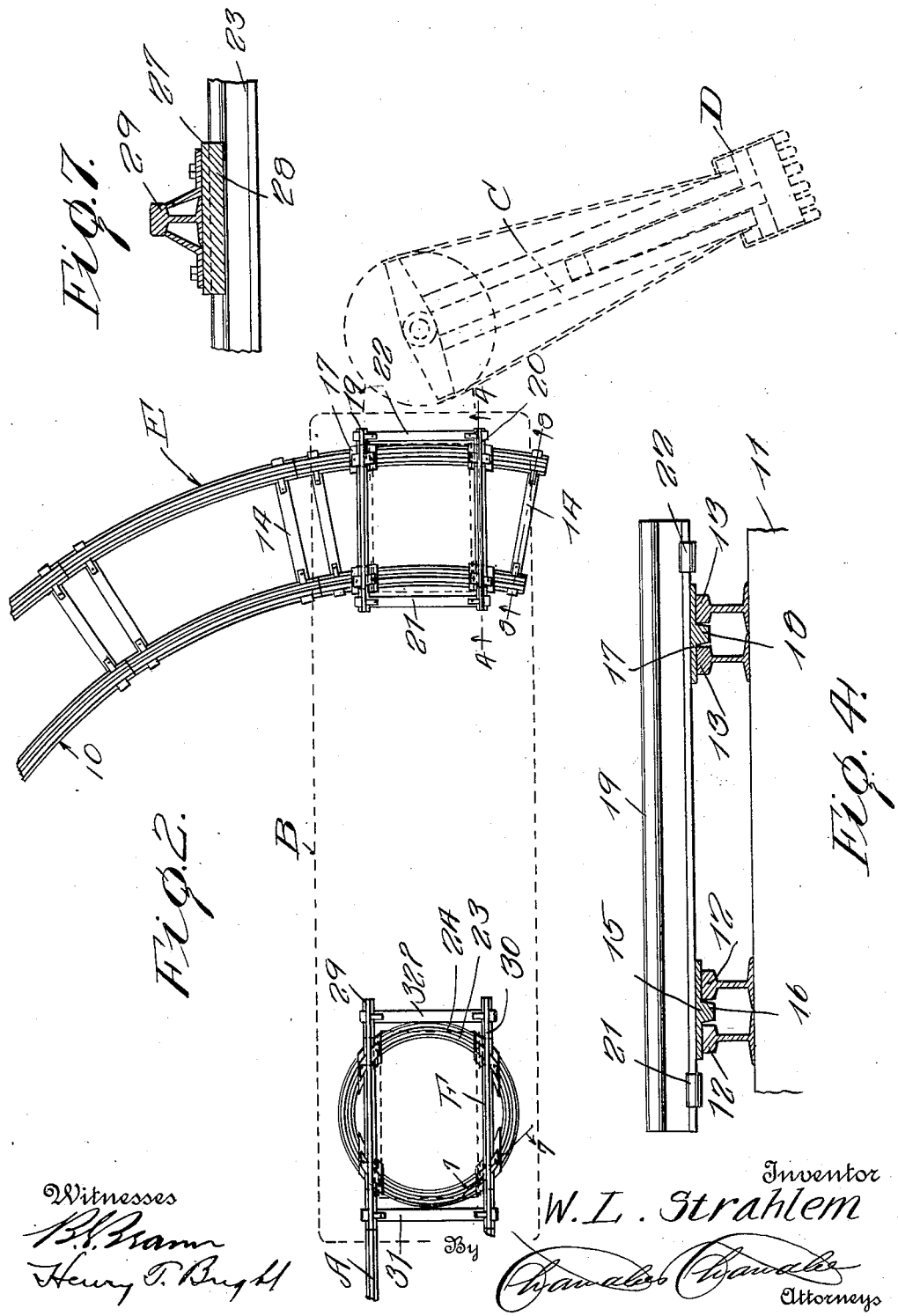

UNITED STATES PATENT OFFICE.

WILLIAM L. STRAHLEM, OF MIDDLE POINT, OHIO.

TURNING DEVICE FOR STEAM-SHOVELS.

1,077,174.

Specification of Letters Patent. Patented Oct. 28, 1913.

Application filed March 20, 1913. Serial No. 755,749.

*To all whom it may concern:*

Be it known that I, WILLIAM L. STRAHLEM, a citizen of the United States, residing at Middle Point, in the county of Van Wert, State of Ohio, have invented certain new and useful Improvements in Turning Devices for Steam-Shovels; and I do hereby declare the following to be a full, clear, and exact description of the invention, such as will enable others skilled in the art to which it appertains to make and use the same.

This invention relates to turning devices for steam shovels.

The object of the invention resides in the provision of a turning device for steam shovels which includes a system of trackage and associated parts which will permit the turning of the steam shovel to be effected through the medium of the operation of the boom and dipper of the shovel.

A further object of the invention resides in the provision of a device of the character named whereby a steam shovel may be turned in a relatively short period of time.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view showing the invention associated with the working track of a steam shovel the latter being illustrated typically in dotted lines and in the position it would occupy just before moving into operative relation to the turning device; Fig. 2, a view similar to Fig. 1 showing the shovel in operative relation to the turning device and the boom and dipper in position to institute the turning of the shovel upon sliding of the dipper; Fig. 3, a view similar to Fig. 2 showing the shovel partially turned; Fig. 4, a section on the line 4—4 of Fig. 2 with all the parts of the shovel omitted; Fig. 5, a detail plan view showing the manner of supporting the forward end of the shovel during the turning movement through the medium of jack blocks; Fig. 6, a detail view looking at the under side of the circular track of the turning device which supports the rear truck of the shovel and showing the manner of connecting the terminals of the sections of said circular track together; Fig. 7, a section on the line 7—7 of Fig. 2; and Fig. 8, a section on the line 8—8 of Fig. 2.

Referring to the drawings A indicates the working track of a steam shovel which latter is typically indicated in dotted lines at B and is shown as including the usual boom C and dipper D all operating in the usual and well known manner.

The turning device which forms the subject matter of this particular invention is shown as comprising a front truck supporting track E and a rear truck supporting track F. The front truck supporting track is shown as comprising a plurality of track sections 10, three such sections being employed for the purpose of illustration but this number may be varied according to circumstances. Each of the track sections 10 comprises a plurality of ties 11 upon which are mounted spaced pairs of rails 12 and 13, the rails of each pair being disposed relatively close together and being curved to form the arcs of circles whose common center is the pivot of the rear truck of the shovel. These sections 10 are arranged end to end so that the rails 12 and 13 of said sections are disposed in continuous curves respectively. The pairs of rails 12 and 13 are held together by suitable tie bars 14. Mounted upon the rails 12 are shoes 15 provided centrally with a rib 16 extending between the rails 12. These shoes 15 are slidable upon the rails 12 for a purpose that will presently appear. Mounted upon the rails 13 are shoes 17, each of which is provided with a rib 18 extending between said rails 13. These shoes are also slidable upon the rails 13. Rails 19 and 20 are mounted upon respective shoes 15 and 17 and these rails are held in the desired spaced relation by means of tie bars 21 and 22.

The rear truck supporting track of the device is shown as comprising concentrically arranged circular rails 23 and 24 suitably supported upon ties 25. Each of the rails 23 and 24 is constructed of a plurality of sections which are connected together at their adjacent ends by means of a plate 26 secured to the under side of said rails. Supported upon the rails 23 and 24 are shoes 27 each of which is provided with a rib 28 on its under side extending between the rails 23 and 24. Mounted upon respective pairs of these shoes 27 are rails 29 and 30 which are held in suitable parallel spaced relation by means of tie bars 31 and 32. As the shoes 27 are slidable on the rails 23 and 24 it will be apparent that the tracks 29 and 30 can be rotated about the common center of the rails 23 and 24.

When the steam shovel B has reached the end of the working track A and it is desired to turn same about it is only necessary to first lay the track sections 10 at the end of the working track in the manner shown in Fig. 1 and then position the rails 20 in alinement with respective rails of the working track. A section of the working track between the trucks of the shovel is then removed and the rear truck supporting track F applied just forward of the rear truck of the shovel with the rails 29 and 30 in alinement with respective rails of the working track. With the parts thus arranged the shovel B is moved forward until the forward truck rests entirely on the rails 19 and 20 and the rear truck rests entirely on the rails 29 and 30. The boom C and dipper D is then moved to the position shown in Fig. 2 and the dipper subsequently forced outwardly while in engagement with the ground. This movement of the dipper will eventually shift the shovel B, rails 19 and 20 and rails 29 and 30 to the position shown in Fig. 3, it being understood that the rear truck has been previously secured against pivotal movement in a suitable manner. When one of the sections 10 have been passed over by the rails 19 and 20 said section is removed and arranged in position at the opposite end of the front truck supporting track E. This operation is repeated until the shovel B is completely turned.

In order to provide against any tilting tendency at the forward end of the shovel during the operation of turning the front truck of the shovel is suitably secured by rods 33 to jack blocks 34 slidably disposed upon the rails 12 and 13 on opposite sides of said front truck.

What I claim is:—

1. In a steam shovel turning device the combination with a working track of a plural section arc shaped track extending across the working track and including spaced pairs of rails, shoes mounted on each pair of rails and provided respectively with ribs on their under sides extending between the rails of respective pairs whereby said shoes are capable of a sliding movement on said rails parallel spaced rails supported by the shoes engaged with respective pairs of spaced rails for receiving the front truck of a shovel, and a turn table between the working track and arc shaped track and including a pair of spaced circular rails disposed concentric with the spaced pairs of rails of the arc shaped track, shoes slidably mounted on said circular rails, and parallel spaced rails mounted on said shoes for receiving the rear truck of the shovel.

2. In a steam shovel turning device, the combination with a working track, of a plural section arc shaped track extending across the working track and including spaced pairs of rails, shoes slidably mounted on each pair of rails, parallel spaced rails supported by said shoes for receiving the front truck of a shovel, and a turn table between the working track and arc shaped track including a pair of spaced circular rails disposed concentric with the spaced pairs of rails of the arc shaped track, shoes slidably mounted on said circular rails and spaced parallel rails mounted on said shoes for receiving the rear truck of a shovel.

In testimony whereof, I affix my signature, in the presence of two witnesses.

WILLIAM L. STRAHLEM.

Witnesses:
T. M. BAXTER,
W. M. McGINNIS.

Copies of this patent may be obtained for five cents each, by addressing the "Commissioner of Patents, Washington, D. C."